United States Patent
Hurst-Hiller et al.

(10) Patent No.: US 7,672,931 B2
(45) Date of Patent: Mar. 2, 2010

(54) SEARCHING FOR CONTENT USING VOICE SEARCH QUERIES

(75) Inventors: Oliver Hurst-Hiller, Seattle, WA (US); Julia Farago, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 301 days.

(21) Appl. No.: 11/170,144

(22) Filed: Jun. 30, 2005

(65) Prior Publication Data

US 2007/0005570 A1 Jan. 4, 2007

(51) Int. Cl.
G07F 17/30 (2006.01)

(52) U.S. Cl. .......................................................... 707/3
(58) Field of Classification Search ................... None
See application file for complete search history.

(56) References Cited

U.S. PATENT DOCUMENTS

| | | | | |
|---|---|---|---|---|
| 5,991,739 A * | 11/1999 | Cupps et al. | ............ | 705/26 |
| 6,615,172 B1 * | 9/2003 | Bennett et al. | ............ | 704/257 |
| 6,650,997 B2 * | 11/2003 | Funk | ............ | 701/207 |
| 6,999,932 B1 * | 2/2006 | Zhou | ............ | 704/277 |
| 7,027,987 B1 * | 4/2006 | Franz et al. | ............ | 704/236 |
| 7,228,340 B2 * | 6/2007 | De Boor et al. | ............ | 709/217 |
| 2002/0116377 A1 * | 8/2002 | Adelman et al. | ............ | 707/3 |
| 2003/0037043 A1 * | 2/2003 | Chang et al. | ............ | 707/3 |
| 2003/0061054 A1 * | 3/2003 | Payne et al. | ............ | 704/277 |
| 2004/0162674 A1 * | 8/2004 | Fan et al. | ............ | 701/211 |
| 2005/0143999 A1 * | 6/2005 | Ichimura | ............ | 704/251 |
| 2005/0171936 A1 * | 8/2005 | Zhu | ............ | 707/3 |
| 2005/0283369 A1 * | 12/2005 | Clausner et al. | ............ | 704/275 |
| 2006/0116876 A1 * | 6/2006 | Marcus | ............ | 704/231 |
| 2006/0116987 A1 * | 6/2006 | Bernard | ............ | 707/3 |
| 2006/0282408 A1 * | 12/2006 | Wisely et al. | ............ | 707/3 |
| 2006/0287985 A1 * | 12/2006 | Castro et al. | ............ | 707/3 |
| 2008/0222127 A1 * | 9/2008 | Bergin | ............ | 707/5 |

OTHER PUBLICATIONS

International Search Report and Written Opinion dated Oct. 17, 2007.

* cited by examiner

*Primary Examiner*—Don Wong
*Assistant Examiner*—Belinda Xue
(74) *Attorney, Agent, or Firm*—Shook, Hardy & Bacon LLP (57) ABSTRACT

A system, method and computer-readable media are disclosed for searching for content from a device. The system, method, and computer-readable media are adapted to transmit a voice search query from a device and can in return allow the device to receive corresponding non-voice search result data. Once non-voice search result data is received it can be displayed to the user on a display of the device.

20 Claims, 7 Drawing Sheets

SEARCHING FOR CONTENT USING VOICE SEARCH QUERIES

CROSS-REFERENCE TO RELATED APPLICATION

Not applicable.

STATEMENT REGARDING FEDERALLY SPONSORED RESEARCH OR DEVELOPMENT

Not applicable.

BACKGROUND

The Internet has become a useful tool over recent years for people to search for various types of information quickly and efficiently. An advantage of the Internet is that one can receive desired content from most parts of the world within just a few moments. Another advantage is that one can search for desired content without having to know every detail regarding the content by utilizing one of the many search engines found on the Internet. For example, with current search engines, it may be possible for one to search for the exact location of a restaurant, including the specific address, by only inputting a the name of the restaurant and the state the restaurant is located in. In another example, it may be possible for one to search for the location and capacity of a stadium by only inputting the name of the stadium in the search engine.

With current technology, searching the Internet can be accomplished using advanced devices such as personal computers and mobile devices. Currently, when attempting to search the Internet using a such devices a user must do so through either a strictly text-based system or a strictly voice-based system. Searching through strictly text-based systems is unfavorable as it presents a very tedious and burdensome task for one to enter and refine queries on devices by hand. Searching through strictly voice-based systems, on the other hand, is unfavorable as the processing time is very long and slow as the system has to read every word to the user.

SUMMARY

The present invention is directed towards a system for searching for content over a network. The system can include an input unit for inputting a voice search query from a user. The system can additionally include an interface for establishing a connection with a search engine. The interface can also be configured to receive non-voice search result data from the search engine. Moreover, the system can include a display unit for displaying the non-voice search result data to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
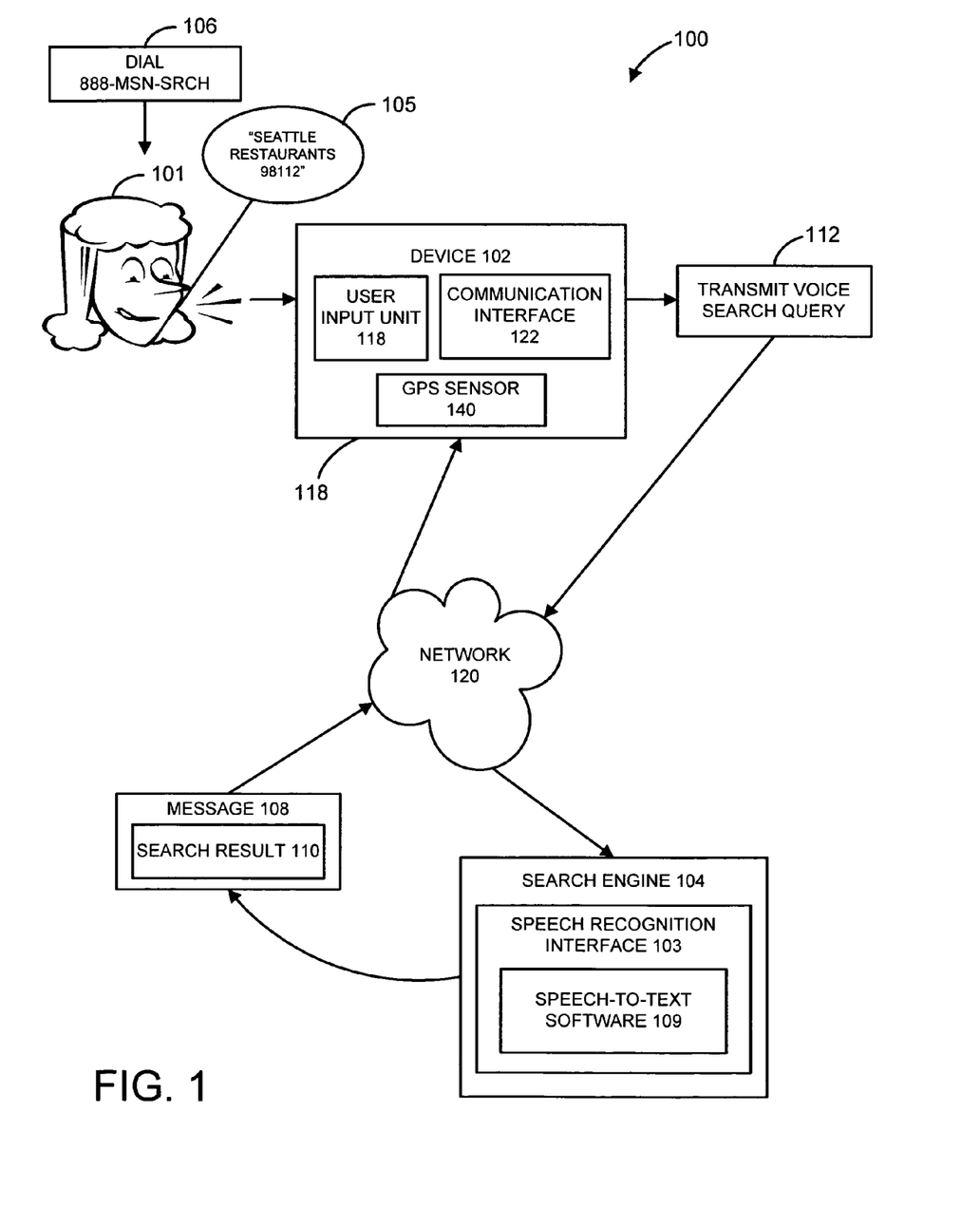
FIG. 1 illustrates an embodiment of a searching system for a device of the present invention.

FIG. 1 illustrates an embodiment of a searching system for a device of the present invention. Search system 100 can be implemented to allow users of devices to search quickly and efficiently for information including shopping, entertainment, food, news and sports for example. User 101 can search for desired information through use of device 102. Device 102 may be, for example, a personal computer (PC), digital still camera device, digital video camera (with or without still image capture functionality), portable media player such as personal music player and personal video player, cell phone (with or without media capturing/playback capabilities), and other devices and mobile devices capable of establishing connections with other devices and capable of transmitting and receiving voice, text, audio, speech, image, or video data.

Figure 5:
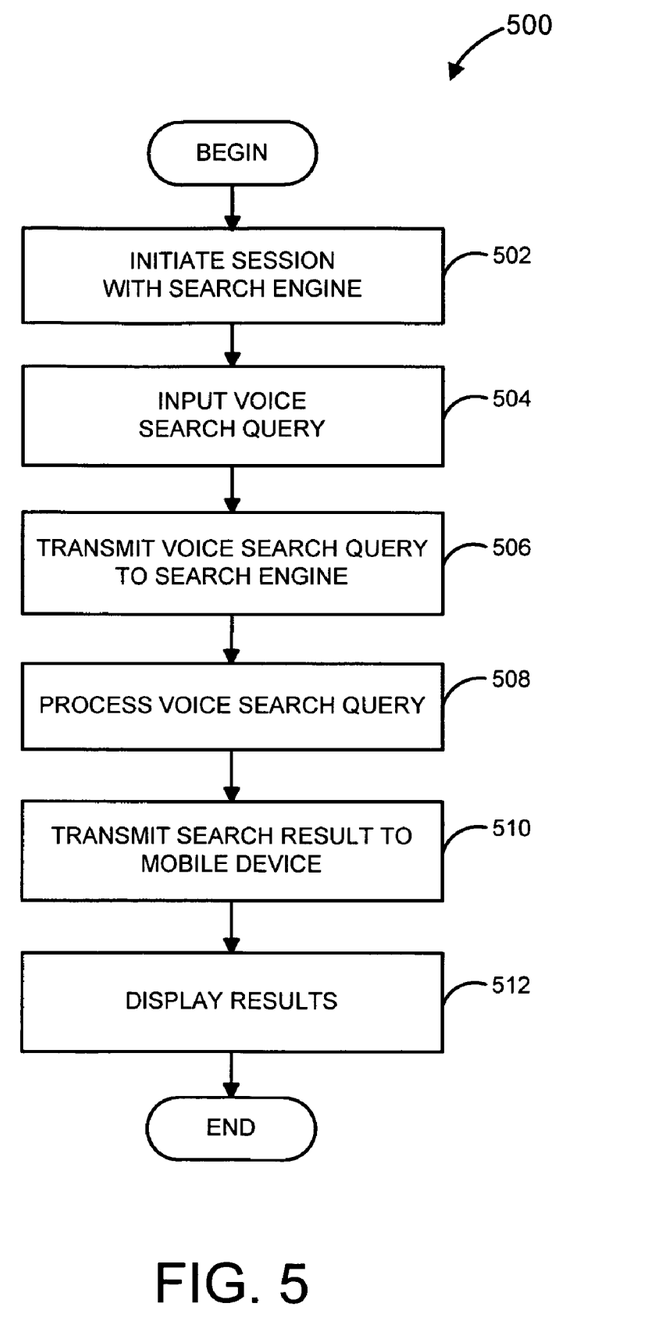
FIG. 5 illustrates an embodiment of a method for generating a voice search query and returning search result data.

To overcome problems with current technology, the present invention can allow a user to input a search query through his/her own speech and conveniently receive search result data including text, audio, speech, image and video data. With reference to FIGS. 1 and 5, a user 101 can first establish 502 a connection with a search engine 104 in order to begin the searching process. In an embodiment, the user 101 can dial 106 a phone number, "888-MSN-SRCH" for example, using device 102 in order to establish a connection with the search engine 104 via network 120. In such an embodiment, network 120 can include a Public Switched Telephone Network (PSTN) and any other telephony network. In another embodiment network 120 can include the Internet, and the user 101 can connect to search engine 104 by using a web browser that can be installed on device 102. The connection can be established through a communication interface 122 of the device 102. The communication interface may be a wireless interface that allows the device to be connected to the search engine over the Internet in order to transmit voice search queries and to receive search result data.

Again with reference to FIGS. 1 and 5, once the connection has been created between the device 102 and search engine 104, the user can then vocally enter his/her search query by inputting 504 a voice search query 105. The user can input his/her voice search query through an user input unit 118. When vocally entering a voice search query, the user can input his/her voice search query through an input device such as a microphone coupled to the user input unit 118. User input unit 118 can be coupled to other input devices such as a keyboard and pointing device, commonly referred to as a mouse, trackball or touch pad. Other input devices may include a joystick, game pad, satellite dish, scanner, or the like. The user can simply say the words of the search query or vocally spell the words in order to create the voice search query 105. For example, as shown in FIG. 1, the user 101 can say "Seattle Restaurants 98112" in order to search for Seattle restaurants with the ZIP code of 98112. In an embodiment, a user's voice search query 105 may only be derived from a predetermined lexicon of words that can be recognized by the search engine 104. The predetermined lexicon of words can be predetermined by the search engine 104 or created by the user 101. The communication interface 122 of device 102 can then transmit 112, 506 the voice search query to the search engine 104. The communication interface 122 may additionally transmit information regarding geographical location information of the device 102 to the search engine 104. The geographical location information can derive from a Global Position Sensor (GPS) 140, an IP address of the device 102, an area code assigned to the device 102, a location of a cell phone tower, etc., or alternatively, the geographical location information can derive from the voice search query. When including geographic location information in a voice search query a user can simply speak the geographic location information such as street names, landmarks, zip codes, etc., to include the geographic location information in the voice search query.

In an embodiment of the invention, a speech recognition interface 103 can be an internal component within the search engine 104. In another embodiment of the invention, the speech recognition interface 103 can be an external component to the search engine 104. When a voice search query 105 is transmitted to the search engine 104 from a device 102, the voice search query can be interpreted and processed 508 by the speech recognition interface 103. Speech recognition interface 103 can interpret the voice search query by using speech-to-text voice-recognition software 109. In interpreting the voice search query 105, the speech-to-text voice recognition software 109 can convert the voice search query into a text search query in order to allow the search engine to search for relevant search result data. In an alternative embodiment, the speech recognition interface 103 can be programmed to speak the voice search query back to the user to confirm that the voice search query has been successfully recognized.

Search engine 104 can be configured to search for and return relevant search result data corresponding to the voice search query 105. Once listings of relevant search result data has been compiled by the search engine 104, the search engine can then transmit 510 the search listings as a search result 110 back to device 102 via a message 108. The search result data can be non-voice data including text, audio, speech, image, and video data. In an embodiment, the search engine can be configured to send only non-voice data as search result data. In such an embodiment voice data does not include audio data or speech data. The message 108 can be, for example, a non-voice message including a Short Message Service (SMS) message, an email message, an Instant Message (IM), etc. In another embodiment of the invention, the search engine 104 can use a caller ID in order to know which particular device the voice search query came from and which particular device to transmit the search result 110 to. Once the search result 110 is received by the device 102, the device can display or present 512 the search result data to the user 101.

Figure 2:
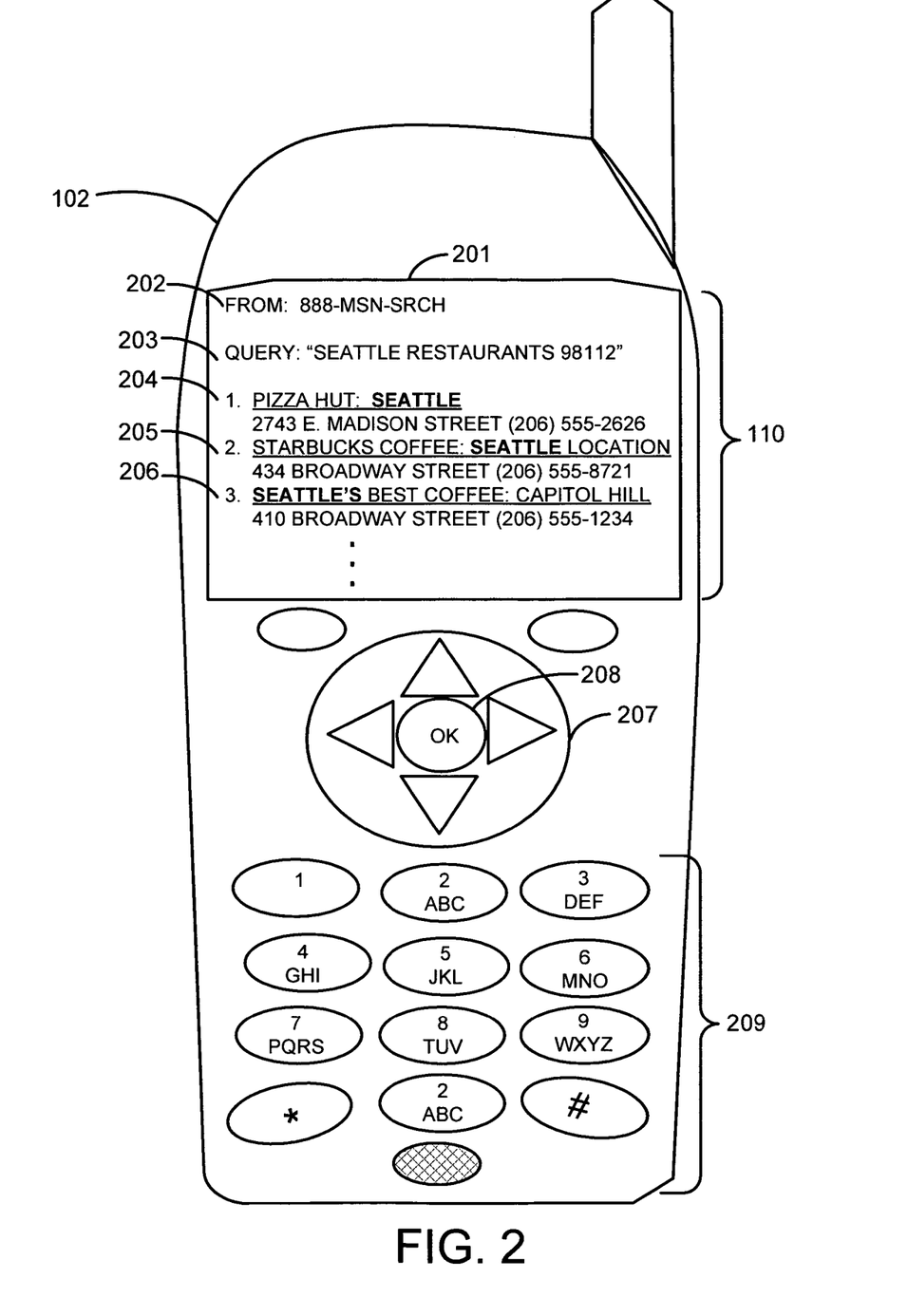
FIG. 2 illustrates an embodiment for displaying search result data on a device.

FIG. 2 illustrates an embodiment for displaying search result data on a device. Device 102 can include a display 201 for displaying and presenting the search result data to user 101. In FIG. 2, a search result 110 can include a header 202 for displaying where the text search result 110 originated from, a header 203 for displaying the original voice search query in text form, and search result data including search listings 204-206. In one embodiment, search listings 204-206 can be a text-only description showing relevant data for each particular listing. In an alternative embodiment, search listings 204-206 can be resource locators that can point a user to a location, such as a web page, of the selected listing. In yet another embodiment, search listings 204-206 can be presented in the form of web pages originating from web sites of the different search listings that the user can browse through.

Moreover, in other embodiments, the search listings 204-206 can include geographic data such as maps. In other embodiments, search listings 204-206 can include any other text, audio, video, and image data. Once the search listings are presented, a user can select and navigate through and select multiple search listings by using user input devices 207-208 that can be coupled to user input unit 118.

Figure 3:
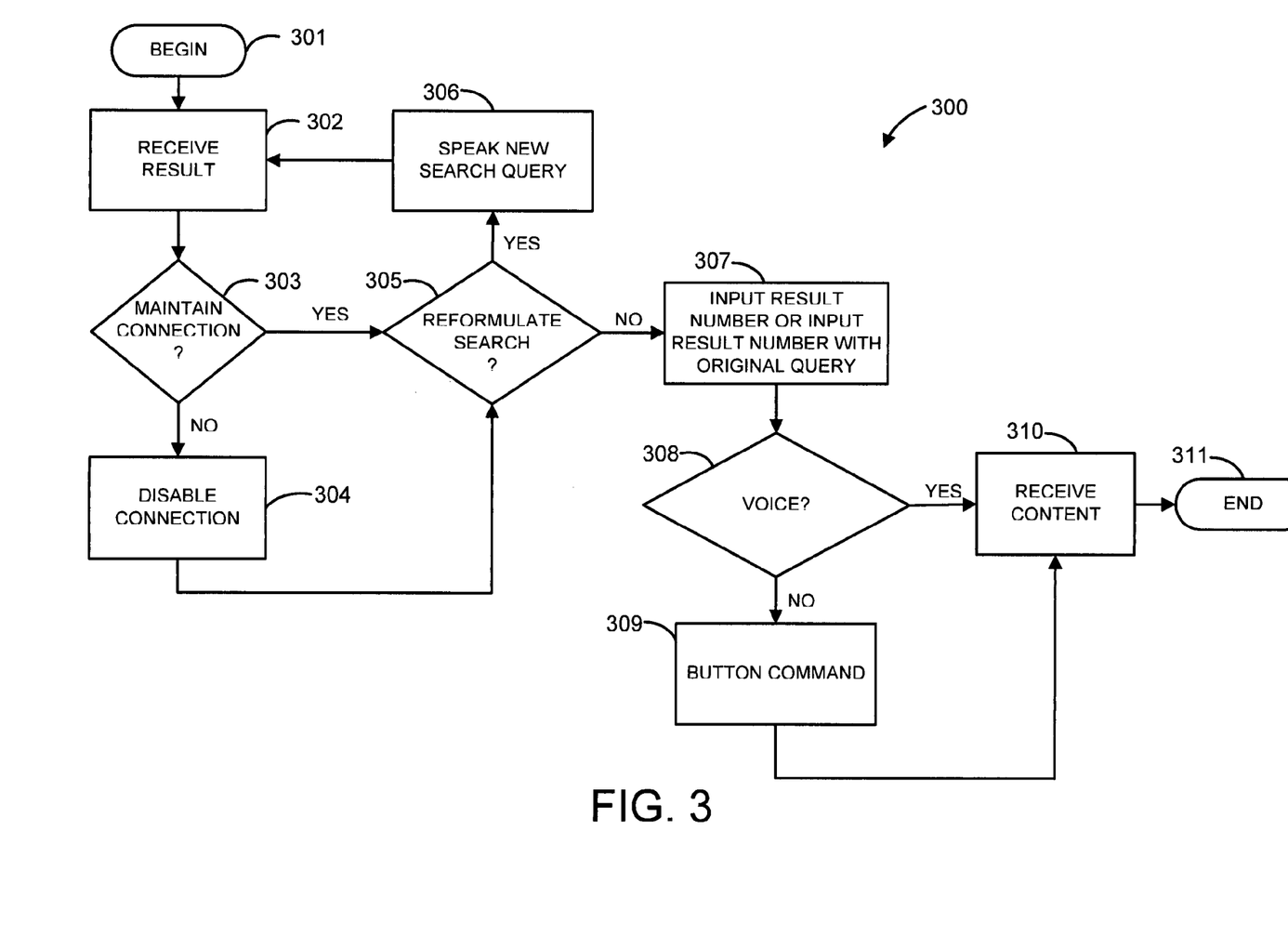
FIG. 3 illustrates an embodiment for responding to search result data.

FIG. 3 illustrates an exemplary method 300 for responding to a search result 110. Once the device receives 302 the search result, the device can maintain the original connection with the search engine at 303 in order to transmit a response to the search result. If not, the connection is disabled at 304 and a new connection can be established to transmit a response. For example, the user can disconnect the phone connection with the search engine, re-dial the original phone number, and submit a response to the search result.

A response to a search result can include a reformulated search query or an input of a result identifier of a desired search listing. At 305, the user can decide whether to reformulate a search query or input a result identifier. If the user desires to reformulate another search query, the user can vocally input 306 a new search query so that the device can receive 302 a new search result. If the user does not wish to reformulate a new search, the user can simply enter 307 the result identifier for one of the desired search listings 204-206. In a case where the device disables its original connection and creates a new connection, the user may need to enter the result identifier of the desired search listing along with the original voice search query.

At 308, the user can choose to enter the result identifier for the desired search listing by vocally speaking the identifier of the desired search listing. Alternatively, the user can enter a button command 309 by depressing corresponding buttons to the identifier of the desired search listing using key pad 209 (FIG. 2). Moreover, the user can utilize navigation button 207 (FIG. 2) to scroll through the different search listings and select the desired search listing by depressing "OK" button 208 (FIG. 2) for example. Once an input for a search listing has been made by the user, the user can receive 310 the desired content of information corresponding to the selected search listing. In other embodiments, content from the search listings can be automatically pushed to the device without requiring the user to select a search listing. For example, content from the most relevant search listing corresponding to the voice search query can be automatically displayed to the user without requiring the user to make any selections.

Figure 4:
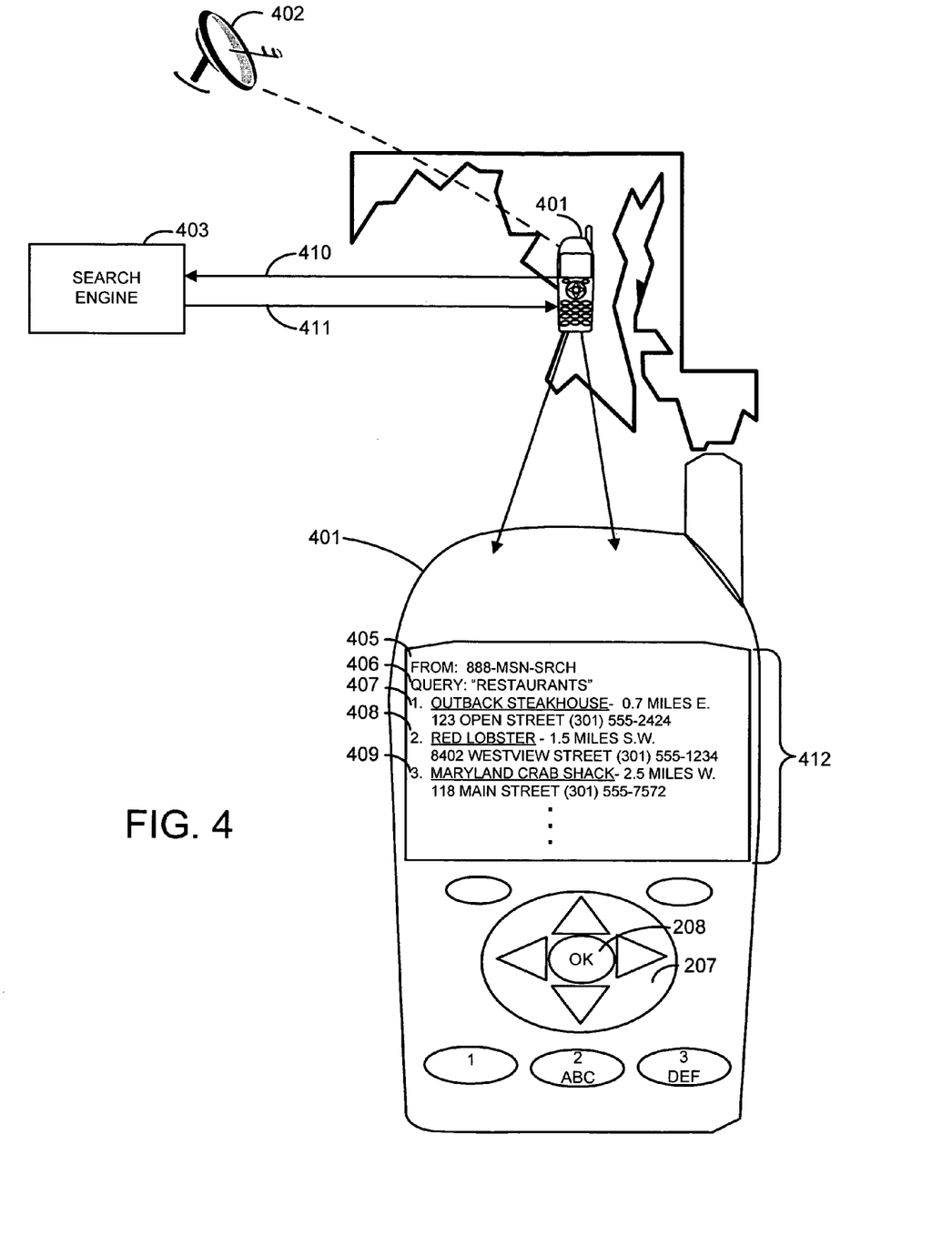
FIG. 4 illustrates an alternative embodiment for displaying search result data.

FIG. 4 illustrates an alternative embodiment for displaying and presenting search result data. FIG. 4 shows an example in which the search result data displayed to the user depends on a voice query and geographic location information. In FIG. 4, device 401 can include a GPS (FIG. 1) that can monitor the device's specific geographic location. GPS can locate the device's location through use of satellite 402. Satellite 402 can transmit a signal to the GPS within device 401 to inform the device of its exact geographic location. Device 401 can then transmit its location along with the voice search query to the search engine to inform the search engine of the device's exact geographic location. Search engine 403 can then use the information regarding the geographic location of the device to transmit search result data that can be relevant to the location of the device. For example in FIG. 4, device 401 is located in the state of Maryland. Satellite 402 can transmit a signal to a GPS sensor within device 401 to inform the device of its current location within the state of Maryland. The device can then send the information regarding its geographic location within Maryland along with a voice search inquiry 410 to the search engine 403. Search engine 403 can then transmit a search result 411 to the device that is relevant to the voice search query as well as the device's geographic location.

In the projected view of device 401, the search result 412 includes header 405 to notify the user where the text search result came from, and header 406 to display the specific voice search query the search engine is responding to. Search listings 407-409 can be displayed to the user in the order of relevance based on the voice search query and the geographic location of the device. For example, search listings 407-409 can inform the user of the closest restaurants relative to the device's geographic location for the user's search query of "restaurants." The search listings may include, for example as shown in FIG. 4, the distance and direction the restaurants are located with respect to the device's geographic location.

In another embodiment, a device can alternatively include user profile data along with a voice search query to send to a search engine. User profile information can include a user's work address, home address, age, sex, or any other information that can describe the user and his/her preferences. In such an embodiment, search result data transmitted from a search engine can depend on information corresponding to the user profile and a particular voice search query. For example, a user can login, with a username and password, to either a device, search engine, or external server that can store the user's profile. The user's profile information can be transmitted to the search engine along with a voice search query in order for the search engine to generate relevant search result data. The search result data can be customized based on the user profile information that the search engine receives from the user as well as the particular voice search query. Once the search result data had been generated, the search result data can be transmitted to the device the user is operating.

Figure 6:
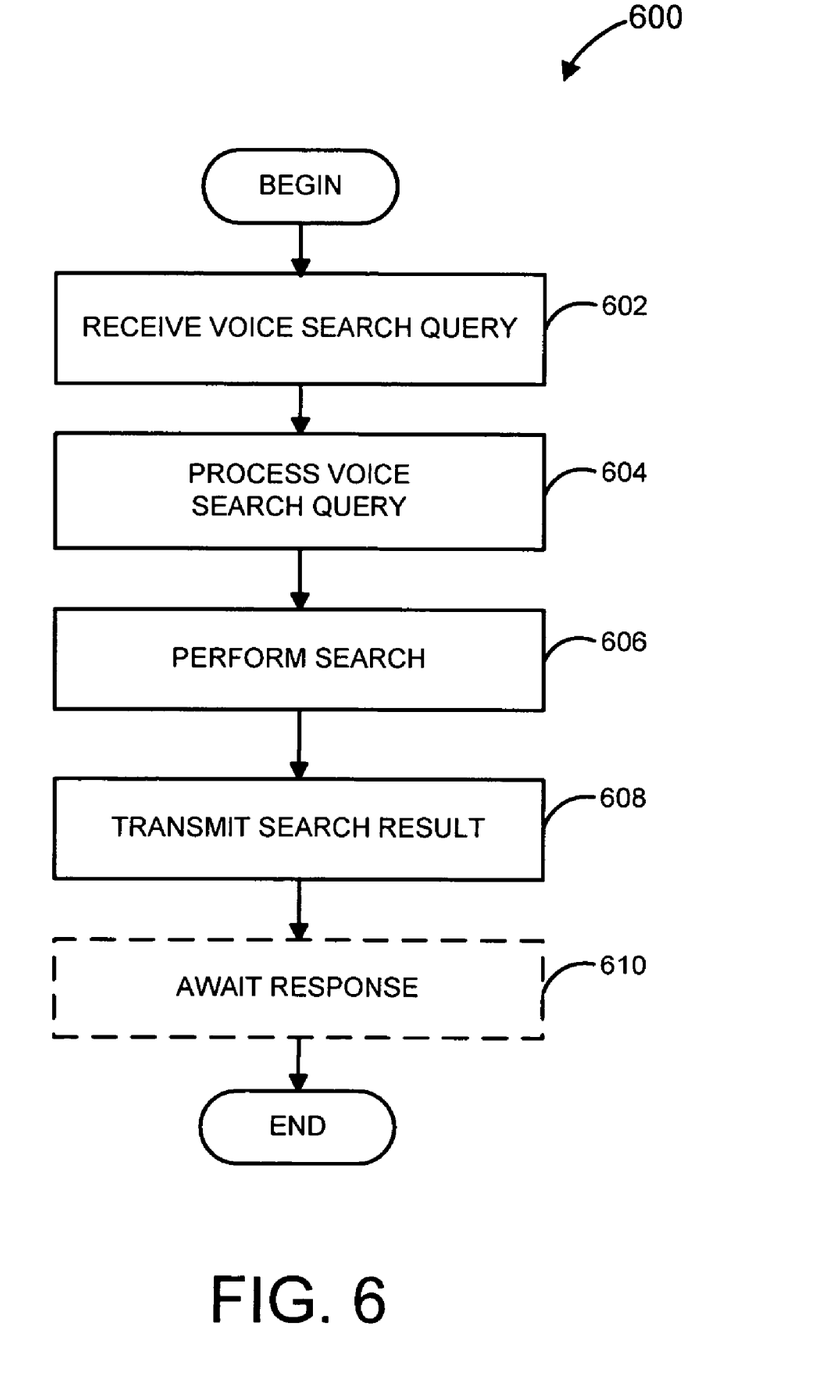
FIG. 6 illustrates an embodiment for receiving a voice search query and returning search result data.

FIG. 6 illustrates an exemplary method 600 for receiving a voice search query and returning a search result. Once a voice search query is received 602 from a device, the search engine can begin a processing 604 phase. In the processing phase, the search engine can parse for any other information including a phone number, geographic location information, and user profile information. Again, geographic location information can include information from a GPS), an IP address of the device, an area code assigned to the device, a location of a cell phone tower, street names, landmarks, zip codes etc. The processing phase can also include a speech recognition interface using speech-to-text software to convert the voice search query into a text search query in order for the search engine to search for relevant search result data. In an alternative embodiment, the speech recognition interface can be programmed to speak the voice search query back to the user to confirm that the voice search query has been successfully recognized. The search engine can then use the converted text search query in order to allow the search engine to search 606 for relevant search result data corresponding to the text search query and the parsed information including geographic location information and user profile information. Once a list of relevant search result data has been compiled by the search engine, the search engine can then transmit 608 the search result data as a search result back to the device via a message. In an embodiment, the message can be, for example, non-voice message including a Short Message Service (SMS) message, an email message, an Instant Message (IM), etc. After the message has been sent to the device, the search engine can await 610 for a response from the device that can follow a similar procedure as outlined in FIG. 3.

Figure 7:
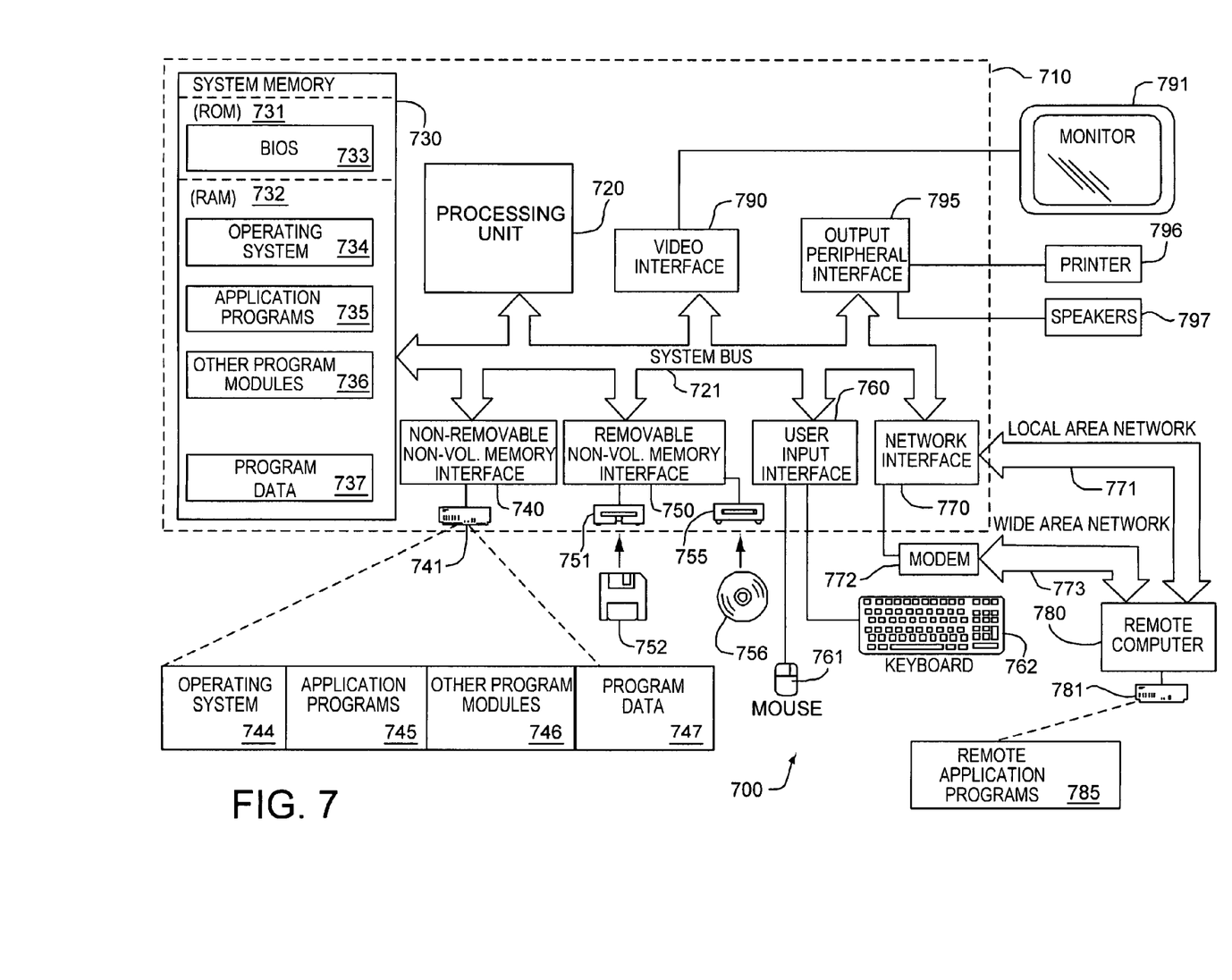
FIG. 7 illustrates an exemplary computing environment adapted to implement an embodiment of the present invention.

FIG. 7 is a block diagram that illustrates a computing environment adapted to implement the present invention. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the invention includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 740 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through an non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through a output peripheral interface 790.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

We claim:

1. A system for searching for content, the system including a processor and being embodied on one or more computer storage media, comprising:

an input unit for inputting at least one voice search query, wherein at least one search-query-relevant geographic location can be derived from the at least one voice search query;

a GPS (Global Position Sensor) device for automatically determining a geographical location of the system;

a communication interface for establishing a connection with a search engine, for transmitting the at least one voice search query, the geographical location and a user profile, for receiving a Short Message Service (SMS) message including non-voice search result data from the search engine, and for receiving a confirmation voice search query of a converted text search query, wherein the converted text search query is based on the at least one voice search query, wherein the confirmation voice search query serves to confirm the at least one voice search query; and a display device that presents the non-voice search result data, wherein the non-voice search result data includes a first header for displaying where the non-voice search result data originated from, a second header for displaying the voice search query in text form, and one or more non-voice search result listings.

2. The system according to claim 1, wherein the non-voice search result data is derived from at least one of the search-query-relevant geographical location, the geographical location of the system, or the user profile.

3. The system according to claim 1, wherein the voice search query is derived from a predetermined lexicon of words.

4. The system according to claim 1, wherein the connection with the search engine is established utilizing an E.164 compatible number associated with the search engine.

5. The system according to claim 1, wherein the non-voice search result data includes at least one of a web page, a resource locator, text data, or geographic data.

6. The system according to claim 1, wherein the communication interface maintains the connection with the search engine for transmitting a response to the non-voice search result data, the response including at least one of a reformulated search query or an input of a result identifier.

7. The system according to claim 1, wherein the communication interface disables the connection with the search engine and creates a new connection with the search engine for transmitting a response to the non-voice search result data, the response including at least one of a reformulated search query or an input of a result identifier with the at least one voice search query.

8. system according to claims 6, wherein the response is executed by at least one of a voice command or a button command.

9. The system according to claim 5, wherein the non-voice search result data is automatically shown on the display device without requiring a response.

10. One or more computer storage media having computer-usable instructions stored thereon for performing a method for transmitting search results, the method comprising:
receiving one or more voice search queries, a geographical location associated with the one or more search queries, a geographic location of the requesting device, and a user profile from a requesting device, wherein the geographical location associated with the one or more search queries is derived from the one or more voice search queries, and the geographic location of the requesting device is automatically provided by a GPS (Global Position Sensor) associated with the requesting device;
processing the one or more voice search queries received from the requesting device by converting the one or more voice search queries into at least one text search query;
processing the at least one text search query by converting the at least one text search query into a confirmation voice search query, wherein the confirmation voice search query is communicated to the requesting device to confirm the processing of the one or more voice search queries;
searching for one or more search results corresponding to the at least one text search query, the one or more search results including non-voice search result data, wherein the non-voice search result data includes a distance and direction relative to the geographical location of the requesting device; and
transmitting the non-voice search result data to the requesting device, wherein the non-voice search result data includes a first header for displaying where the non-voice search result data originated from, a second header for displaying the voice search query in text form, and one or more non-voice search result listings.

11. The method according to claim 10, further comprising transmitting the non-voice search result data via a non-voice message.

12. The method according to claim 10, wherein the non-voice search result data includes at least one of a web page, a resource locator, text data, audio data, speech data, image data, geographic data, and video data.

13. The method according to claim 10, wherein processing one or more voice search queries further includes parsing for at least one of geographical location or the user profile.

14. The method according to claim 13, further comprising searching for the non-voice search result data based on the user profile.

15. The method according to claim 10, wherein the requesting device is a mobile device.

16. A method for transmitting search results, comprising:
receiving one or more voice search queries, a geographical location associated with the one or more search queries, a geographic location of the requesting device, and a user profile from a requesting device, wherein the geographical location associated with the one or more search queries is derived from the one or more voice search queries, and the geographic location of the requesting device is automatically provided by a GPS (Global Position Sensor) associated with the requesting device;
processing the one or more voice search queries received from the requesting device by converting the one or more voice search queries into at least one text search query;
converting the at least one text search query into a confirmation voice search query, wherein the confirmation voice search query serves to confirm the processing of the one or more voice search queries;
processing the geographical location of the requesting device and the user profile;
searching for one or more search results corresponding to the at least one text search query, the one or more search results including non-voice search result data, wherein the non-voice search result data includes a distance and direction relative to the geographical location of the requesting device; and
transmitting the non-voice search result data to the requesting device, wherein the non-voice search result data includes a first header for displaying where the non-voice search result data originated from, a second header for displaying the voice search query in text form, and one or more non-voice search result listings.

17. The method according to claim 16, wherein the non-voice search result data includes at least one of a web page, a resource locator, text data, audio data, speech data, image data, geographic data, and video data.

18. The method according to claim 16, wherein processing one or more voice search queries further includes parsing for at least one of the geographical location associated with the one or more search queries or the user profile.

19. The method according to claim 18, further comprising searching for the non-voice search result data based on the at least one of the geographic location associated with the one or more search queries and the user profile.

20. The method according to claim 16, wherein the requesting device is a mobile device.

* * * * *